United States Patent [19]

Kallen

[11] 4,380,700

[45] Apr. 19, 1983

[54] IMAGE BLANKING CIRCUIT FOR LINE FOLLOWER

[75] Inventor: George H. Kallen, Indianapolis, Ind.

[73] Assignee: Union Carbide Corporation, Danbury, Conn.

[21] Appl. No.: 278,137

[22] Filed: Jun. 29, 1981

[51] Int. Cl.³ ............................................... G05B 1/00
[52] U.S. Cl. ..................................... 250/202; 318/577
[58] Field of Search ......................... 250/202; 318/577

[56] References Cited

U.S. PATENT DOCUMENTS 4,049,962 9/1977 Kallen ................................. 250/202

Primary Examiner—David C. Nelms
Assistant Examiner—Darwin R. Hostetter
Attorney, Agent, or Firm—Eugene Lieberstein

[57] ABSTRACT

A window generation circuit is provided for gating image signals from an electronically scanned sensor array in a line tracing machine. The window generation circuit includes two shift registers of variable length for measuring intervals of time for setting first and second bounds to a sector scan. The interval of the second register corresponds to the width of the window. Logic circuitry, responsive to the detection of image data, alters the electrical lengths of the registers to enlarge the window in the absence of an image, and restores the original lengths upon return of the image.

17 Claims, 15 Drawing Figures

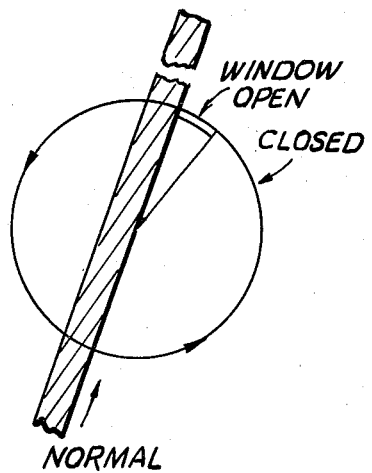
FIG.11A NORMAL
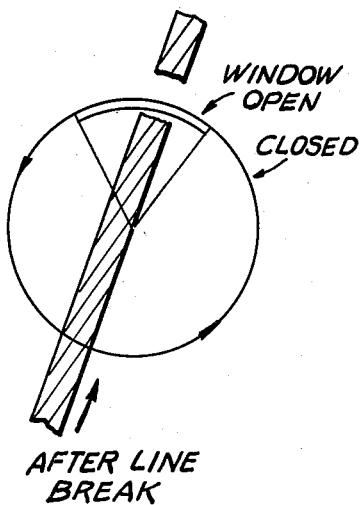
FIG.11B AFTER LINE BREAK
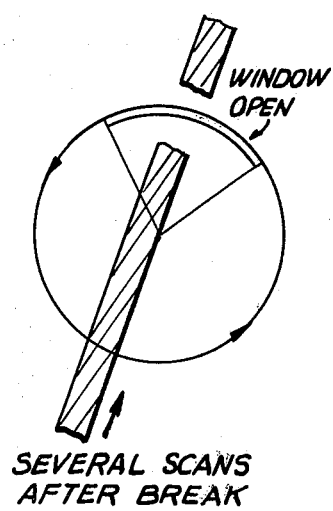
FIG.11C SEVERAL SCANS AFTER BREAK
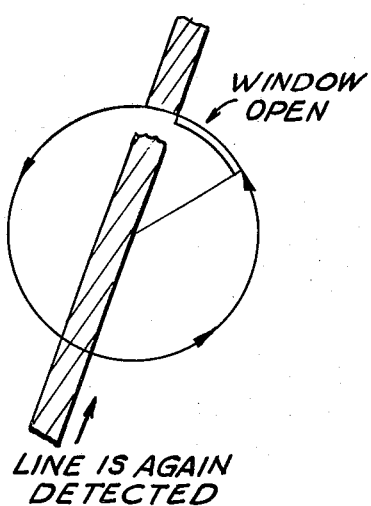
FIG.11D LINE IS AGAIN DETECTED
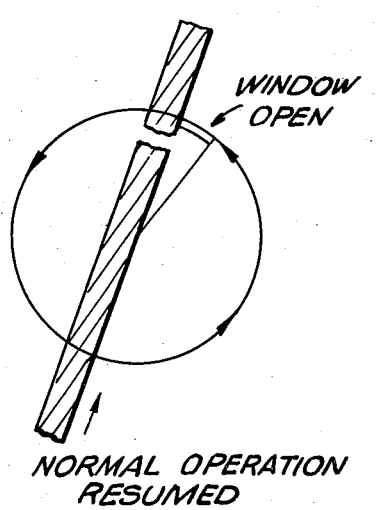
FIG.11E NORMAL OPERATION RESUMED

IMAGE BLANKING CIRCUIT FOR LINE FOLLOWER

BACKGROUND OF THE INVENTION

This invention relates to a system for tracing a line or the edge of a line to activate an X-Y coordinate drive machine to follow a path described by the line. More particularly, the invention relates to a window generation circuit for use with an optical scanning head of such a system to inhibit the reception of incorrect image points.

Systems for tracing lines have been known for many years. However, such systems typically employ image sensing devices which require a mechanical rotation of a scanning head or the optics associated therewith to achieve satisfactory tracing. More recently, U.S. Pat. No. 4,049,962 which issued Sept. 20, 1977 in the name of the present inventor discloses a line edge follower wherein the image sensing head is operated electronically so as not to require mechanical rotation of the head or of optical elements therein. Electronic scanning of a circular array of photodiodes extracts the requisite points of an image of the line being traced for producing the necessary drive signals which activate the motors of the coordinate drive.

The description of the line edge follower disclosed in the foregoing U.S. Pat. No. 4,049,962 is hereby incorporated by reference.

In use, such a tracing machine may be employed to position a cutting tool on a workpiece in the metallurgical arts by following along a line on a template. The cutting machine may also be used in cutting other materials as well as in scribing markings on various materials.

While the tracing machine disclosed in the foregoing patent operates satisfactorily, a problem has been noticed in the case of a defective template wherein a break is found in the line being traced. Due to the circular scanning of the photodiodes about the circular array, as the machine advances along the template line, image points of the broken portion of the line are detected by the scanned array. The absence of an image point designating the presence of the line, at the location of the break, sensitizes the system to an image point of the line at another location within the scan. Resulting motor drive signals have directed the motors to rotate in the reverse direction with a consequent damaging of the workpiece.

SUMMARY OF THE INVENTION

The aforementioned problem is overcome and other advantages are provided by a window generation circuit adapted for use with scanned arrays of detectors. As used herein, the term "window" is understood to refer to an interval of time, and a corresponding portion of the aforementioned scan, during which image data is admitted to a scanning system. The window is said to be open when signals conveying such data are admitted to the scanning system. The window is said to be closed when signals conveying such data are excluded from the scanning system, as by use of a gating or blanking circuit.

The operation of the window generation circuit is synchronized with the scanning system so that specific points of an image can be received or blanked during a scan of an array of photodetectors. Synchronization of the operation of the window generation circuit and the scanning system is accomplished by use of a common time base.

While the window generation circuit may be utilized in a variety of applications wherein it is required to receive certain signals while blanking other signals, the preferred embodiment of the invention has been implemented in conjunction with a line edge follower constructed substantially such as that of the foregoing U.S. Pat. No. 4,049,962. As disclosed therein, a phase locked frequency multiplier circuit is utilized for producing timing, or clock, pulses at a rate much higher than the rate at which the array is scanned. For example, where the array contains 64 photodiodes, the clock rate is 64 times the rate at which the circular array is scanned. The clock rate is used for extracting data from individual ones of the photodiodes and, furthermore in accordance with the invention, is used for operating the window generation circuit in synchronism with the scanning operation.

In accordance with the invention, the window generation circuit comprises a plurality of serially connected shift registers, each of which may be of electronically variable lengths. Two such registers are utilized in the preferred embodiment of the invention with an output terminal of a first one of the registers being coupled to an input terminal of the second of the registers. A common clock pulse signal operates both shift registers. A detected image point enters the first register and propagates therethrough upon successive applications of the clock pulse. The time required to propagate through the shift register is a measure of a time interval of the scanning operation. The serial coupling between the two registers provides for a further time measurement as the detected image point propagates through the second register. Subsequent to the admission of the image point signal to the first register, all the stages of the register are reset or cleared so as to render the window circuit nonresponsive to future image points until the timing interval of the first register has been completed. Also, the first stage of the second register is maintained in a reset or cleared state subsequent to the admission of an image point signal until the measurement interval of the first register has been completed.

The window generation circuit further includes a multivibrator responsive to a point of the image, or trace, of the line being followed for generating a strobe signal which may be used, by way of example, for operating the sample-and-hold circuits in the line edge follower of the foregoing patent. The multivibrator is maintained in a reset condition, desensitized to input image point signals during the measurement interval of the first shift register. Thereby, the first boundary of the open portion of the window is attained upon completion of the measurement interval associated with the first shift register. In a similar manner, the measurement interval of the second register designates the concluding boundary of the open portion of the window. Thus, the measurement interval of the second register provides the width of the open portion of the window during which interval image signals may be received. Since the first shift register is reset immediately after receipt of the image point with a subsequent disabling of the foregoing multivibrator, the second boundary of the window is not utilized when image points occur at the anticipated times.

In the event that image points do not occur, as in the foregoing situation wherein there is a break in the template line, the window is opened to the amount corresponding to the interval of the second register. In addition, the invention provides for a flip-flop which, in response to the absence of the expected image point, activates a set of length control lines of the two shift registers for altering their respective time intervals so as to further widen the bounds of the window, and to center the window about the expected position in the scanning pattern of the anticipated image point. The first multivibrator is maintained in the disabled condition so that no false image points are received during the break in the template line, with a consequent cessation in the production of the strobe pulses for the aforementioned sample-and-hold circuits. Thereby, the coordinate drive motors continue to rotate at constant rates until a subsequent scan picks up the requisite image points. Thereupon, the and flip-flop restores the shift registers to their initial propagation time intervals. Normal operation of the line edge follower then resumes. As a result, the line edge follower incorporating the invention is able to track through a break in the template line, the coordinate drive motors operating essentially on memory with the unchanged values stored in the sample-and-hold circuits, during operation through the break in the template line.

BRIEF DESCRIPTION OF THE DRAWINGS

The aforementioned aspects and other features of the invention are explained in the following description taken in connection with the accompanying drawings wherein:

FIGS. 11A–11E depict operation of the system in the presence of a break in the template line.

DESCRIPTION OF THE PREFERRED EMBODIMENT

Figure 1:
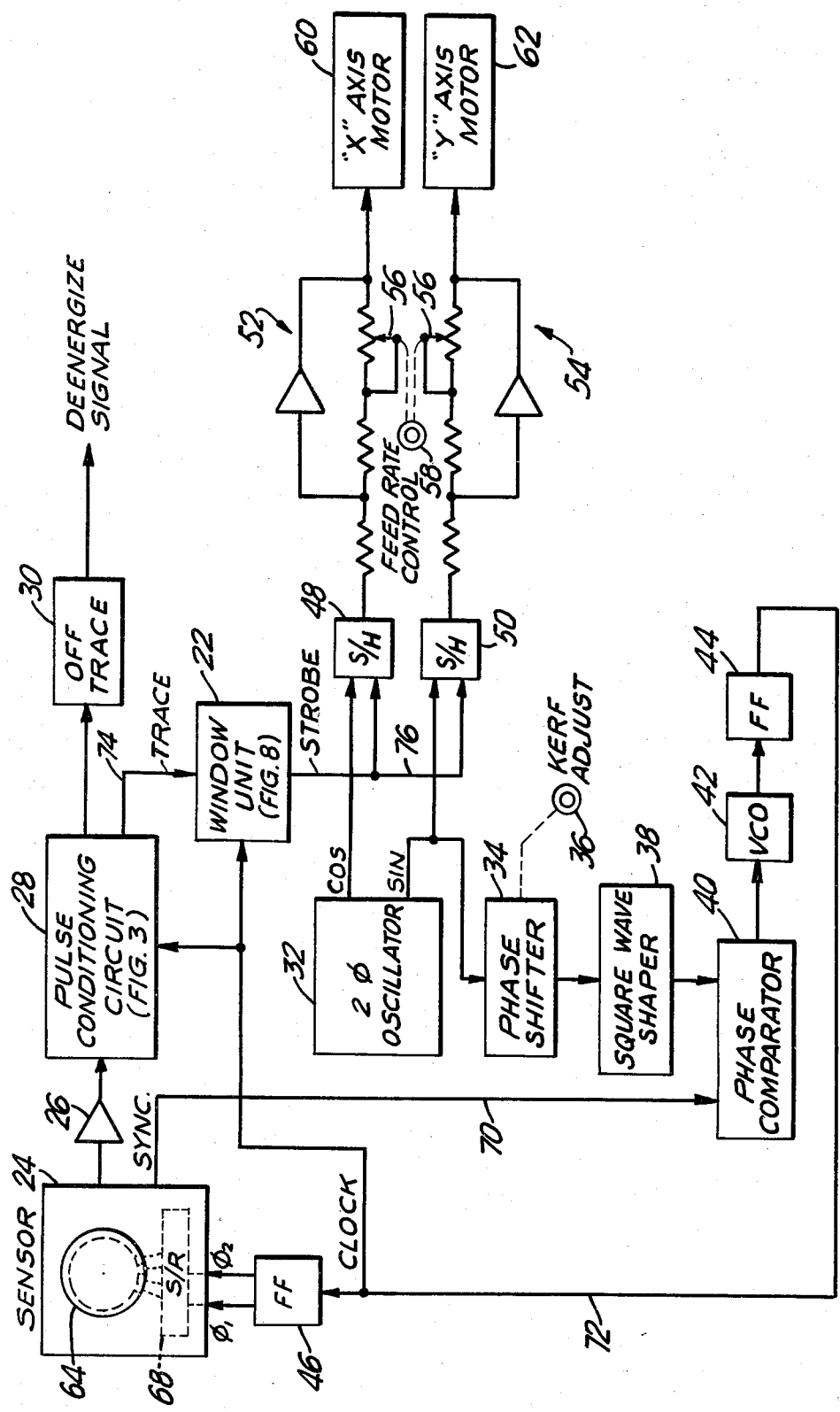
FIG. 1 is a block diagram of a system, including a window unit of the invention, for driving a line tracing machine.

Referring now to FIG. 1, there is shown a diagram of the electrical portion of a line follower system 20 incorporating a window unit 22 in accordance with the invention. With the exception of the window unit 22, the components of the system 20 shown in FIG. 1 correspond to the components set forth in FIG. 1 of the foregoing U.S. Pat. No. 4,049,962. These components are a sensor 24, a video amplifier 26, a conditioning circuit 28, an off-trace unit 30, an oscillator 32, a phase shifter 34 including a potentiometer 36 for manually adjusting the phase to compensate for kerf, a square wave shaper 38, phase comparator 40, a VCO (voltage control oscillator) 42, flip-flops 44 and 46, sample-and-hold circuits 48 and 50, drive amplifiers 52 and 54 depicted with gain control resistor networks including potentiometers 56 mechanically coupled to a knob 58, a motor 60 for driving along the X coordinate axis, and a motor 62 for driving along the Y coordinate axis. The sensor 24 is composed of a circular array 64 of photosensitive diodes 66 upon which an image of a line segment being traced is to be cast. Such arrays are available commercially and include, typically, a recirculating shift register 68, shown in phantom, for providing activating signals sequentially to individual ones of the diodes 66. The register 68 is driven by clock signals of opposed phase supplied by the flip-flop 46.

In operation, the sensor 24 is responsive to the image of a dark line upon a bright background, the image being cast upon the sensor array 64 by well known optics. Electric charges are stored in the diodes 66 depending on the intensity of incident light. Upon activation by signals from the shift register 68, individual ones of the diodes 66 are sequentially activated to provide an electrical pulse to the amplifier 26. The activating signals from the shift register 68 are applied in a repeating sequence in response to the clock pulse signals of the flip-flop 46. The sequential and periodic activation of each of the diodes 66 provides for an electronic scanning of the image without the necessity of rotation of the otical system. Dark regions corresponding to the dark image points of the line, and relatively light image points of the background produce a sequence of electrical signals which are amplified by the amplifier 26, the amplitudes of the signals varying in accordance with the portion of the image being scanned.

The oscillator 32 provides two sinusoidal waveforms, the two waveforms differing in phase by 90° so as to provide for the sine and cosine relationship. The sine signal is applied to the sample-and-hold circuit 50 while the cosine signal is applied to the sample-and-hold circuit 48. The sine signal is also applied by the phase shifter 34 and the shaper 38 to the comparator 40. The shaper 38 converts the sinusoidal form of the wave to that of a square wave for use by the comparator 40. A synchronization signal is produced in the sensor 24 by the circuitry of the register 68, the synchronization signal being a square-shaped pulse which is produced once during each circular scan of the array 64. The synchronization signal is also coupled to the comparator 40 for a comparison of phase between the synchronization signal and the square-wave signal of the shaper 38. The difference in phase produces an error signal at the output terminal of the comparator 40, the error signal being coupled to the VCO 42 for adjusting the frequency of oscillation of the VCO 42. The output signal of the VCO 42 is applied to the flip-flop 44 to produce at the output terminal thereof the system clock signal. The clock signal is applied to the flip-flop 46 as well as to the conditioning circuit 28 and to the window unit 22. The clock pulse signals produced by the flip-flop 46 each have a pulse repetition frequency of one half the system clock signal at the input terminal to the flip-flop 46.

In the preferred embodiment of the invention, the array 64 has a total of sixty four diodes 66. Thus, the period of one scan interval includes the sampling intervals for the sixty four diodes 66. Accordingly, the period of the synchronization signal is 64 times the period of the clock signal produced by the flip flop 44. A configuration of the phase comparator 40, in conjunction with the VCO 42, the oscillator 32, and the feedback synchronization signal from the sensor 24 provides a closed-loop phase-locked frequency multiplier wherein the frequency of the clock is 64 times greater than that of the synchronization signal and of the scanning rate of the array 64. Thereby, the operation of the window unit 22 as well as the operation of the sample-and-hold circuits 48 and 50 are synchronized to the scanning in the sensor 24.

Figure 2:
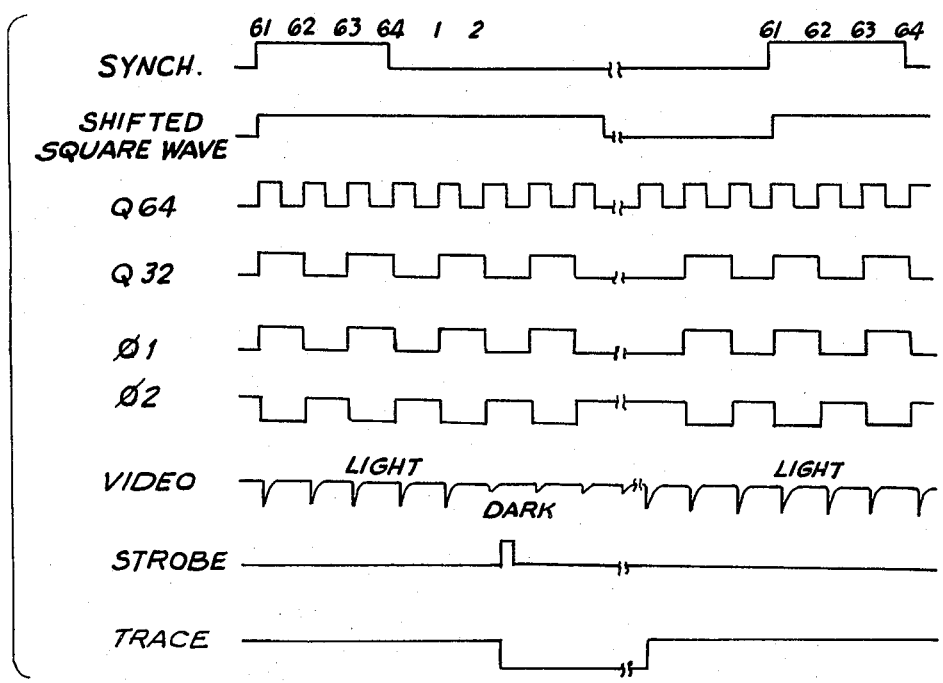
FIG. 2 shows signal waveforms produced by components of the system of FIG. 1.

Referring also to FIG. 2, the synchronization signal on line 70 in FIG. 1 is depicted in the first graph of FIG. 2 wherein the duration of the sync pulse is shown to encompass an interval of three signal samples from three sucessive diodes 66. The diodes 66 may be numbered for ease of identification, as will be seen in FIG. 5, such identifying numerals also appearing in the first graph of FIG. 2.

Proceeding to the second graph of FIG. 2, the square-wave signal produced by the shaper 38 is depicted. With respect to the phase shifter 34, manual adjustment of the potentiometer 36 introduces a predetermined amount of phase shift between the cosine signal of the oscillator 32 and the square-wave signal of the shaper 38. Such phase adjustment provides a convenient electronic compensation for kerf in the operation of the system 20. The position of the square-wave signal in the second graph in FIG. 2 relative to the position of the synchronization signal in the first graph is fixed by virtue of the operation of the phase comparator 40. However, the phases of the output sinusoids of the oscillator 32 may be offset as desired by means of the phase shifter 34. Referring to the third graph of FIG. 2, there is depicted the clock waveform produced by the flip-flop 44. The following graph depicts a waveform having one-half the pulse repetition frequency of the waveform of the third graph. The fifth and sixth graphs represent the two timing signals produced at the output of the flip-flop 46 for use by the sensor 24, it being seen by comparison to the fourth graph that the frequency of the timing waveforms is one half that of the clock signal on line 72. The next graph represents the video signal which is produced by the sensor 24 and amplified by the amplifier 26. In particular, it is noted that the larger amplitude signal pulses are associated with areas of the image having relatively strong intensity of light while the relatively low amplitude pulses are associated with points of the image which are darker. Such dark pulses are associated with image points lying on the template line.

Returning to FIG. 1, the remaining components will now be described. The conditioning circuit 28 produces a trace signal on line 74 having an amplitude which follows the envelope of the sequence of video pulse signals at the amplifier 26, these being the video signals depicted in the seventh graph of FIG. 2. The off-trace unit 30, if desired, may also be coupled to the conditioning circuit 28, the off-trace unit 30 containing well known monitoring circuitry which operates to turn off the system 20 in the event that the sensor 24 loses the line being traced.

The trace signal on line 74 is processed by a window of the unit 22 to appear on line 76 for strobing the sample-and-hold circuits 48 and 50 to sample, respectively, the sine and sine signals of the oscillator 32. The sine and cosine signals are locked in phase to the scanning of the array 64 such that the sampling of a maximum amplitude of the sine signal in the circuit 50 indicates that the motor 62 should proceed at full speed in the direction of the Y axis. Due to the phase quadrature relationship between the sine and the cosine signals, the sampling of a maximum amplitude by the circuit 50 is accompanied by a sampling of zero amplitude at the circuit 48. Thus, when the motor 62 is proceeding at full speed, the motor 60 is stationary. Similarly, when the motor 60 is directed to operate at full speed for tracing along the X axis, the motor 62 is stationary. At intermediate orientations of the template line with respect to the X and the Y axes, to be seen in FIG. 6, the motors 60 and 62 proceed at intermediate values of speed so as to follow the line in the requisite direction. Adjustment at the maximum speed rate is controlled by the knob 58 and the potentiometers 56 in the respective circuits of the drive amplifiers 52 and 54.

Figure 3:
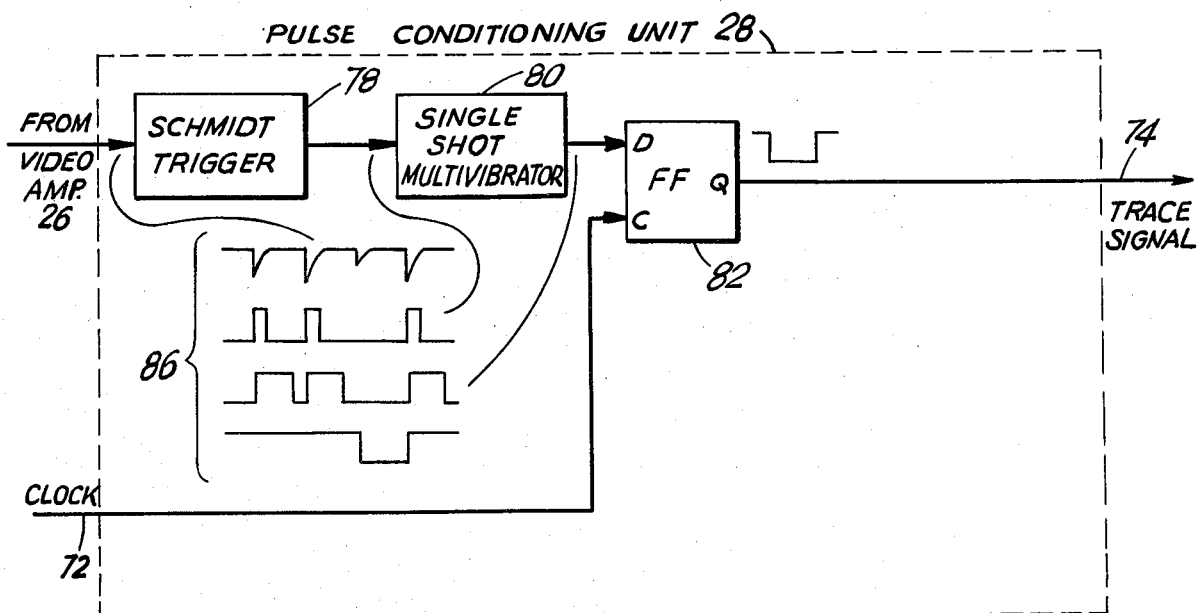
FIG. 3 is a block diagram of a conditioning circuit of FIG. 1.

Referring now to FIG. 3, the conditioning unit 28 comprises a Schmidt trigger 78, a single-shot multivibrator 80, and a type-D flip flop 82. A set 86 of graphs depicts the waveforms of signals at various locations within FIG. 3, the first graph depicting the video signal from the amplifier 26 applied to the input terminal of the trigger circuit 78, the second graph depicting the waveform of the signal applied by the trigger circuit 78 to the multivibrator 80, the third graph depicting the waveform of the signal applied by the multivibrator 80 to the flip-flop 82, and the fourth graph depicting the waveform of the trace signal applied by the output terminal of the flip-flop 82 along line 74.

In operation, the trigger circuit 78 provides a square-waveform pulse in response to the amplitude of individual pulses of the video signal. Thus, for large amplitude video pulses, there is produced in a set of square pulse signals. For relatively small values of video signals, such as the third pulse of the first graph, the trigger circuit 78 produces no output pulse signal. The multivibrator 80, in response to a triggering by pulses of the trigger circuit 78, provides pulses having a duration of approximately three quarters the period of clock pulse signals on line 72. The flip-flop 82, in response to clocking by the clock signal on line 72, samples the signal applied to the D input terminal of the flip-flop 82 from the multivibrator 80. In response to each sampling by the flip-flop 82, the value of the signal at terminal D is transferred to the output terminal of the flip-flop 82. Since the individual video signals are synchronized with the occurrences of the individual clock pulse signals, the wave-form at the output terminal Q of the flip-flop 82 shows a steady value of logic 1 when the pulses in the third graph of the set 86 are present. When one or more of the pulses in the third graph are missing, as results at the third pulse of the exemplary video signal, the D input terminal of the flip-flop has a low value of signal with the result that a logic 0 appears at the Q output terminal at the flip-flop 82. Upon resumption of the pulses of the third graph of the set 86, the value of the signal at the terminal Q returns to logic 1. Thereby, the signal at terminal Q, also depicted in the fourth graph of the set 86, follows the envelope of the video signal in the first graph.

With reference to FIGS. 1, 2 and 3, the strobe signal on line 76 is seen in the eighth graph of FIG. 2. The trace signal at the output terminal Q of the flip-flop 82 is depicted in the bottom graph of FIG. 2 in addition to being shown in the bottom graph of the set in FIG. 3. Thereby, it is seen that a single pulse of the trace signal is produced in response to the scanning operation upon contacting the edge of a region of the image encompassing one or more pulses of the video signal.

Figure 4:
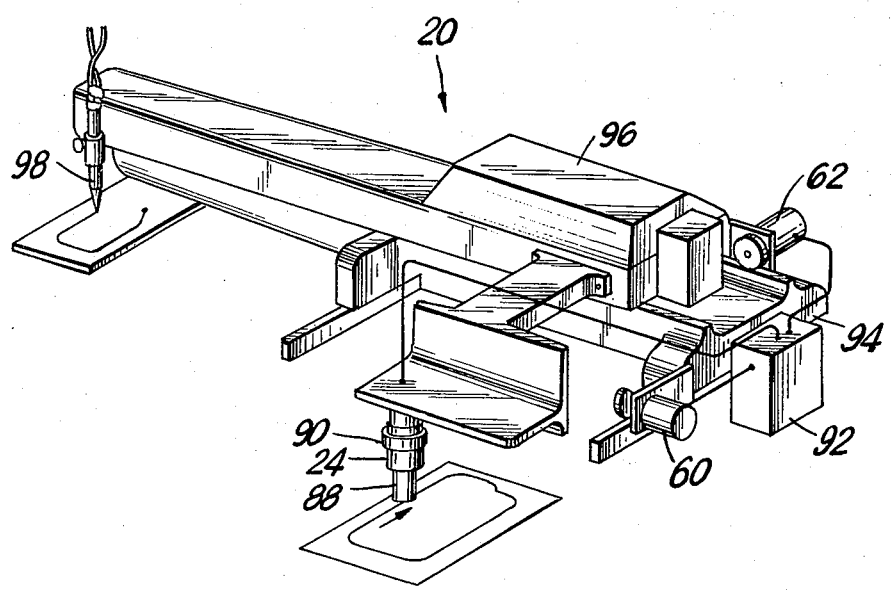
FIG. 4 is a stylized view of a line tracing machine to be driven by the system of FIG. 1.

Referring now to FIG. 4, a typical X-Y coordinate drive cutting machine incorporating the system 20 of the invention is depicted. A sensor 24 (FIG. 1) and a lens system 88 are carried within a housing 90. The circuitry of FIG. 1 is housed within a cabinet 92. The X and Y motors 60 and 62 are shown coupled to the cabinet 92 for driving, respectively, the carriages 94 and 96. An exemplary cutting tool 98 is shown mounted at the end of the carriage 96. The path traced at the tip of the tool 98 follows the line on the template 100. Movement of the tool 98 is the vector sum of the movement in the X and Y directions of the carriages 94 and 96, respectively.

Figure 5:
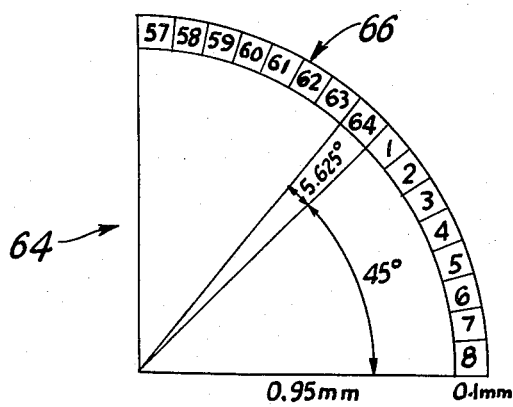
FIG. 5 shows a quadrant of a sensor array of FIG. 1.

Referring now to FIG. 5, a quadrant of the array 64 (FIG. 1) is shown. Individual ones of the diodes 66 are numbered from 1 to 64, sixteen of the diodes 66 being shown in FIG. 5. The angular spacing of an arc is shown for a diode 66 as is the radius of the array 64. The width, in the radial direction, of a diode 66 is also shown in the Figure.

Figure 6:
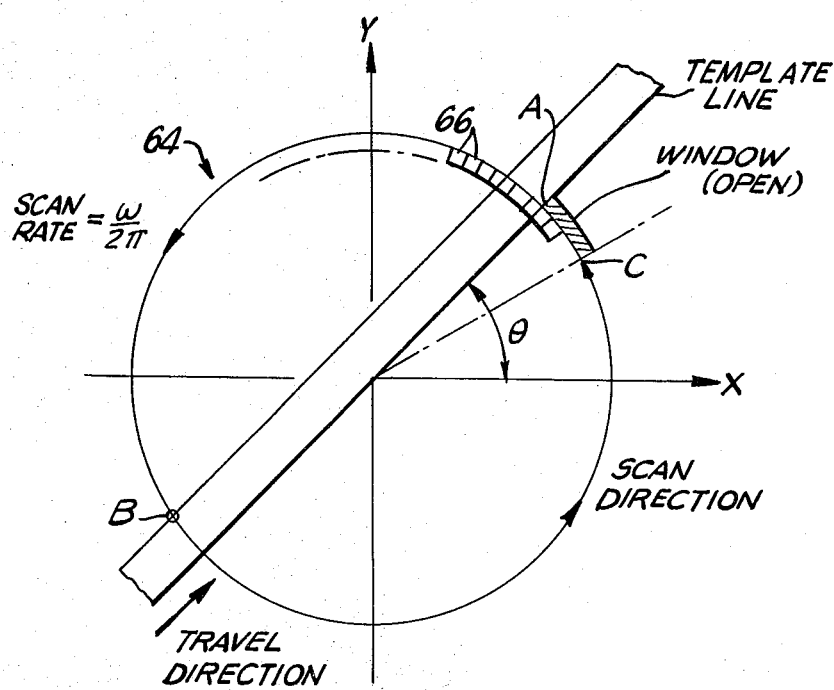
FIG. 6 shows coordinate axes and the image of a template line superposed on the sensor array.

Referring now to FIG. 6, a segment of the template line is shown superposed upon a diagrammatic representation of the array 64 of diodes 66. Typically, the width of the image of the template line is equal to the width of a group of three or four diodes. A larger width of line, and even an edge of an extended dark area, can be traced by use of the sensor 64 (FIG. 1). The scanned direction is indicated by arrows to to be in the counterclockwise direction. The tracing machine (FIG. 4) is understood to be moving along the template line upwardly and to the right as shown by the arrow indicating the direction of travel. As the scanning proceeds in the counterclockwise direction through the open window, video pulses representing light areas are received until point A is reached whereupon low intensity video pulses are received indicating the dark region of the template line. Point A corresponds to the leading edge of the trace signal of the flip-flop 82. Thereafter, the window is closed, in a manner to be described subsequently, to prevent the sensing of any further trace signals on line 74 (FIG. 1). A corresponding tracking situation occurs at point B wherein, in the absence of the window, a further trace signal would occur. However, in the presence of a window, the window extending from point C to point A, only the leading edge at point A activates the tracking operation of the system 20. The template line is seen oriented with reference to the coordinate axes X and Y at an angle measured from the X axis. The edge of the template line is shown, in this example, passing through the center of the array to facilitate measurement of the inclination of the line to the X axis.

Figure 7:
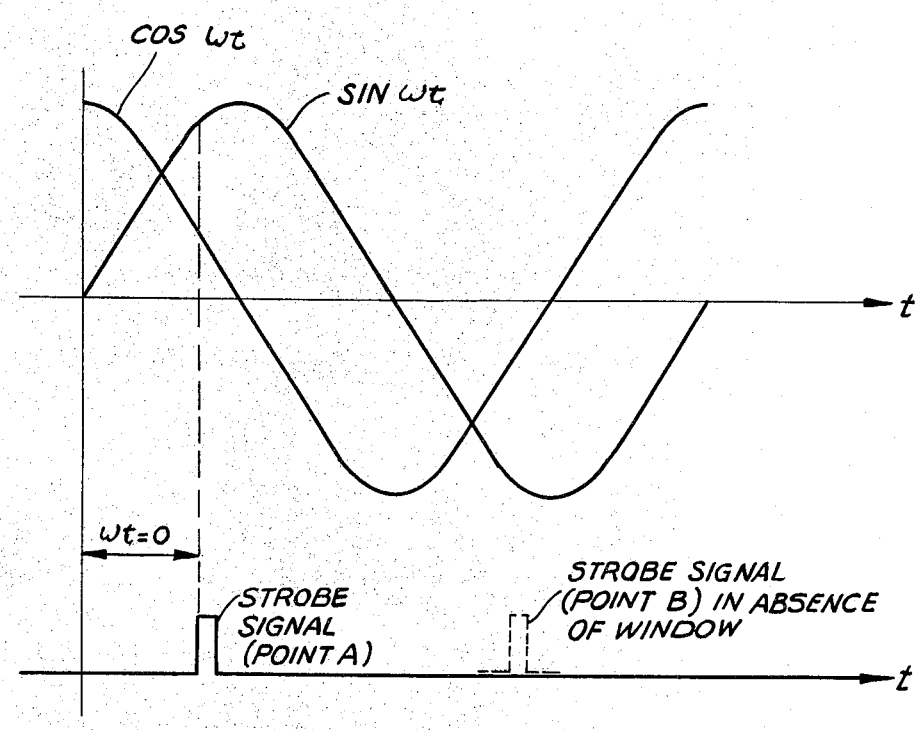
FIG. 7 shows sine and cosine waveforms produced by the oscillator of FIG. 1, the figure further showing the occurrence of the strobe signal with reference to the location of the image in FIG. 6.

Referring also to FIG. 7, the cosine and sine waveforms of the oscillator 32 (FIG. 1) are depicted. The time of occurrence of the strobe signal (FIG. 1) is shown with reference to the two sinusoids, the time of occurrence corresponding to the angle of inclination of the template line relative to the X axis in FIG. 6. Also shown, in phantom, is the time of occurrence of a strobe signal which would occur at point B in the absence of the window unit 22, in which case the trace would be coupled directly to the sample and hold circuits 48 and 50. However, in view of the operation of the window unit 22 in excluding the strobe signal which would be produced at point B, no such strobe signal appears. The scan rate in terms of the radian frequency is also shown in both FIGS. 6 and 7. It is noted that the radian frequency of the scanned rate is the same as that of the two sinusoids of FIG. 7. The operation of the sample-and-hold circuits 48 and 50 (FIG. 1) in sampling the instantaneous values of the cosine and sine waveforms may also be better understood with reference to FIGS. 6 and 7. Thus, in the situation wherein the template line is angled to fall between the positive direction of the X axis and the positive direction of the Y axis, the strobe signal in FIG. 7 shows the cosine signal to be sampled at a point in time where the waveform is dropping from its maximum value towards zero; and the sine signal is sampled at a point in time where the waveform it is rising towards its maximum value. The instantaneous values of the amplitudes of the two samples are held by the sample-and-hold circuits for use by the drive amplifiers 52 and 54 (FIG. 1) to set the rate of rotation of the motors 60 and 62. Thus, the vector summation of the X and the Y coordinates of the speed results in a net direction of travel in a path which follows the template line.

In accordance with the invention, all trace signals are applied to the window unit 22. Only a trace signal occurring when the window is open is passed by the unit 22 to become the strobe on line 76 for activating the sample-and-hold circuits 48 and 50 to sample the sinusoidal waveforms of the oscillator 32 for production of the motor drive signals. The construction and operation of the window unit 22 will now be described.

Figure 8:
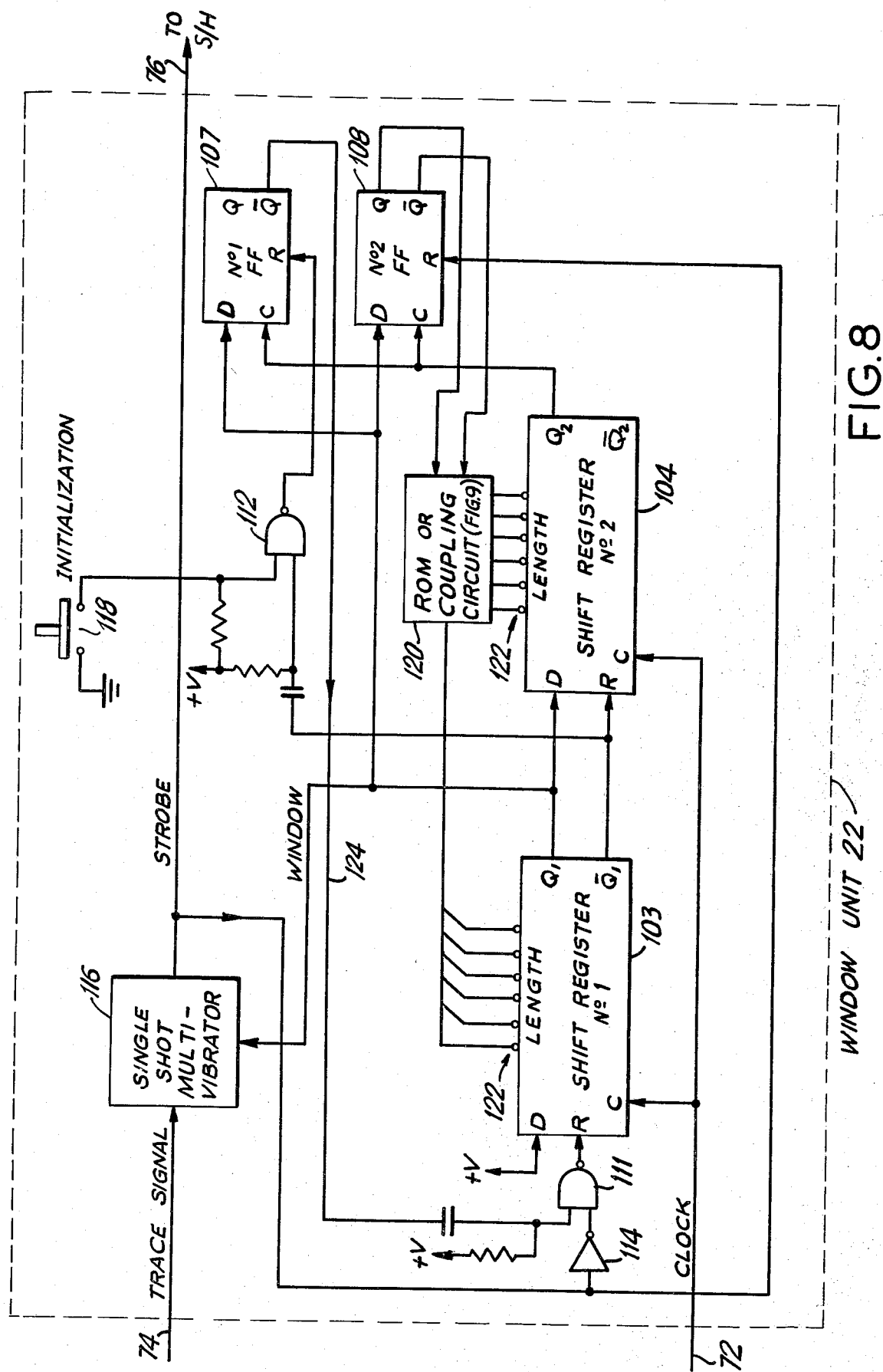
FIG. 8 is a block diagram of the window unit of FIG. 1.
Figure 9:
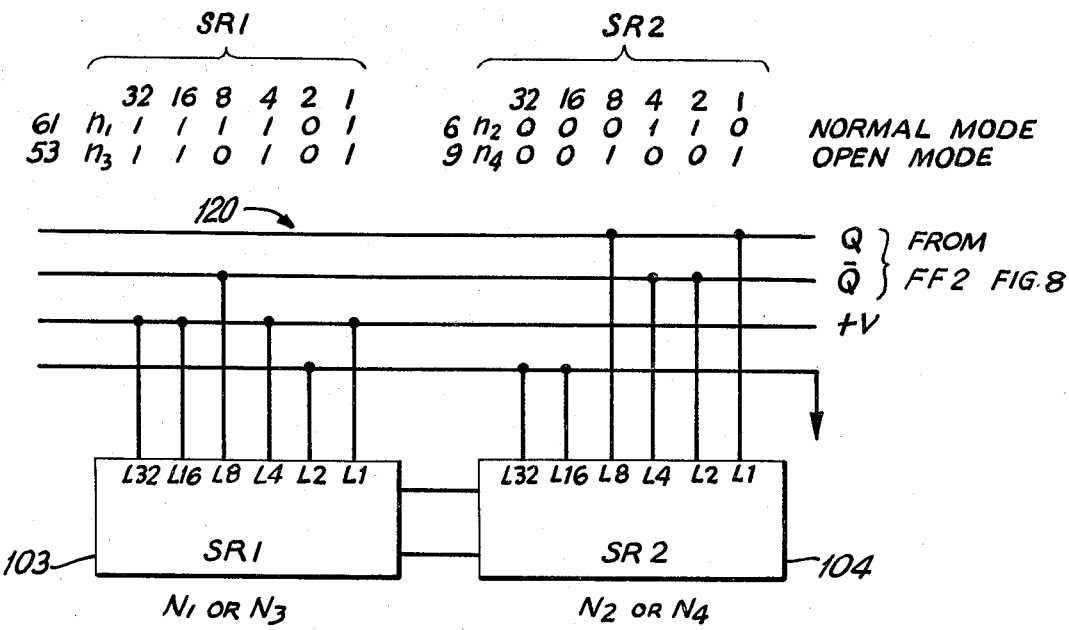
FIG. 9 is a schematic diagram of a connection circuit to control terminals of shift registers of FIG. 8.

Referring to FIGS. 8, 9, 10, and 11A-E, the window unit 22 comprises two shift registers 103 and 104, two flip-flops 107 and 108, two nand gates 111 and 112, an inverter 114, a multivibrator 116, an initialization switch 118, and a coupling circuit 120. The registers 103-104 are constructed in the same fashion and operate in the same manner. Thus, by way of example, the register 103 is fabricated of type-D flip-flops (not shown) which are serially coupled so that, upon clocking of the register at terminal C with the clock signal of line 72, a signal at input terminal D propagates along the register with successive occurrences of the clock pulses. The electrical length of the register is set by connection of terminals 122 via circuit 120 to predetermined values of logic 1 and logic 0 as shown in FIG. 9.

The coupling circuit 120 may be used with one, two or more shift registers, connection with the two registers 103-104 being shown in FIG. 9. Recalling that the sensor 24 (FIG. 1) employes 64 photosensitive diodes, the lengths of the registers 103-104 are set at values less than 64 so that the window will be open during part of a scan of the sensor array, as will become apparent during the ensuing description. Two alternative lengths are shown in FIG. 9 for each of the registers. The figure shows the binary number of stages picked up by each terminal and, in the two tubular entries above the circuit, shows the appropriate logic levels required to provide the designated register lengths. For the first register, lengths of N1=61 and N3=53 are shown. For the second register, lengths of N2=6 and N4=9 are shown. The logic levels which are invariant are obtained by connection to the power supply +V and to ground. The other logic levels are obtained by connection with the output terminals of the second flip flop 108 (FIG. 8). Thus, with respect to each of the registers, either of two lengths can be selected by operation of the flip flop 108. Optionally, by way of alternative embodiments, it is noted that the interconnection of logic levels provided by the circuit 120 can also be provided by means of a ROM (read only memory) wherein the output terminals of the ROM are connected to the registers while the connection to the flip flop 108 would serve as the address to the ROM. The use of the ROM facilitates the selection of other values of register lengths.

As shown in FIG. 8, each of the registers 103-104 is provided with a reset (or clear) terminal R which resets all of the register stages to logic 0 upon application of a logic 1, or high voltage, to terminal R. Since terminal D of the first register 103 is connected to +V, successive clocking of the register 103 gradually fills the stages thereof with logic 1. By the connection of the output terminal Q1 of register 103 to the input terminal D of register 104, the stages of the register 104 fill with logic 1 subsequent to the foregoing filling of the register 103.

The multivibrator 116 serves as the gating unit whereby the window is opened or closed. The multivibrator 116 is of the single-shot type which produces the output strobe pulse on line 76 in response to triggering by the trace signal on line 74. The operation of the multivibrator 116 is dependent on the logic state at its reset terminal R. A logic 0, or low voltage, at terminal R disables the operation of the multivibrator. A logic 1 at the terminal R enables the operation. Thus, the multivibrator 116 is operational only when the output state of the register 103 is high. The multivibrator 116 may be triggered on the rising or falling edge of the waveform of the output signal of the flip-flop 82 (FIG. 3) to produce the strobe signal on line 76. The choice of leading or trailing edge triggering is based on the phase relationship between the system 20 (FIG. 1) and the location of the image of the template line in the sensor 24. For example, leading edge triggering provides a trace signal having a leading edge corresponding to the incident of contact of the scanning pattern with the image of the line.

Reviewing the operation of the window unit 22 thus far, the first register 103 gradually fills with logic 1, the time elapsed during the filling depending on the electrical length of the register. Thereby, upon presetting the length to a specific value, the register 103 can serve as a means for measuring the time elapsed during a portion of the scanning of the sensor array 64. Similarly, the second register 104 can serve as a means for measuring a subsequent time interval of the scanning operation. The connection of the complemented output terminal of the first register 103 to the reset terminal of the second register 104 insures that the second register remains in a reset condition until such time as when the first register becomes filled.

Accordingly, the sequence of operation proceeds as follows. First the register 103 begins to fill with logic 1. Upon completion of the filling, two events occur, namely, the multivibrator 116 is enabled, and the register 104 begins to fill. Upon completion of the filling of the register 104, the output signal thereof triggers the flip flop 108 to address the coupling circuit 120 to alter the lengths of the registers 103-104. At the beginning of a curve tracing operation, the switch 118 is manually depressed momentarily to reset the components of the window unit 22.

Figure 10:
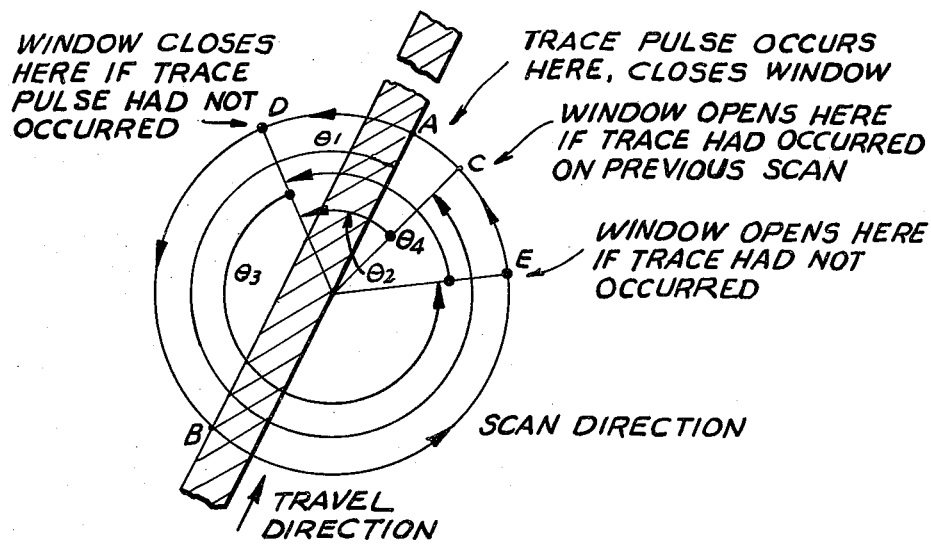
FIG. 10 shows angles useful in describing windows.

The operation of the window unit 22 may be better understood with reference to the scanning diagram of FIG. 10. The trace signal on line 74 (FIGS. 1 and 8) is understood to have occurred at point A in FIG. 10. The resulting strobe signal on line 76 is applied by inverter 114 and the Nand gate 111 to reset the shift register 103. The aforementioned coupling of the register 103 to the reset terminal of the register 104 results in the resetting of the register 104 also. Thereupon, the register 103 begins to measure elasped time of scanning from point A of FIG. 10. The register 103 measures an interval of time equal to N1 clock pulses, at which time the scan has arrived at point C in FIG. 10. The multivibrator 116 is now enabled and the register 104 begins to measure time. The enabling of the multivibrator 116 opens the window for reception of the trace signals.

For purposes of demonstration, it is now assumed that no image point of the template line is received and that, therefore, there is no trace signal and no strobe signal. Such a condition can arise when the scan reaches a break in the template line. The register 104 continues to count and measures an interval of time equal to N2 clock pulses at which time point D is reached in the scanning pattern. It is noted that the window has been open from point C until point D. Upon the filling of the register 104, the aforementioned triggering of the flip-flop 108 occurs to alter the lengths of the registers 103 and 104 to correspond, respectively, to the numerals N3 and N4 as set forth in the tables of FIG. 9.

A further event takes place upon the filling of the register 104, namely, the triggering of the flip-flop 107 by the signal at terminal Q2 of the register 104. An output terminal of the flip-flop 107 is coupled by a line 124 and Nand gate 111 to the reset terminal of the register 103. Accordingly, both the registers 103 and 104 become reset at point D of the scanning pattern. It is noted that the line 124 connects with the Nand gate 111 by a capacitor so as to provide for leading edge triggering. The junction of the capacitor terminal and the Nand gate terminal is connected by a resistor to +V as is common practice for maintaining one terminal of a gate at a logic 1 state in the absence of the triggering signal.

Proceeding now with the second pass of the scan beyond point D, the register 103 proceeds to measure elapsed time of scanning as was done during the previous pass of the scan. Since the register 103 now has a length of N3, which is less than N1, the register 103 becomes filled after a shorter interval of time. The filling of the register 103 occurs at point E on the scan pattern. At point D when the register 103 was reset, the multivibrator 116 was disabled thereby closing the window. Now, at point E when the register 103 again becomes filled, the multivibrator 116 is enabled to open the window. As may be seen in FIG. 10, the arc extending from point E to point D represents a much larger window opening which enhances the chance that an image point of the template line will be detected. For example, in the event that the template line underwent a sharp curve, such sharp curve being the reason for the loss of the image point, then the widening of the open window would enable capturing of the image point.

Continuing with the measurement of elapsed time of the scanning, at point E the register 104 begins to measure elapsed time for a count of N4. The value of N4 is greater than the value of N2 to accommodate the increase in arc size from point E to point D. Whereupon the registers 103 and 104 are again reset. The scanning continues through the larger window until an image point is received. When an image point is received, the strobe signal resets both the register 103 and the flip-flop 108. The resetting of the flip-flop 108 restores the original window size. Thereby, the four identified scanning angles in the pattern of FIG. 10 correspond to the numerals N1-N4. Also, it is noted that the size of the open window in FIG. 10 has been exaggerated so as to facilitate visualization of the window.

The FIGS. 11A–11E further demonstrate the operation of the system 20 including the window unit 22 of the invention in the presence of a break in the template line. In FIG. 11A, the window with the normal size is depicted, the window being closed upon reception of an image point at the edge of the template line. In FIG. 11B, the tracing machine has advanced along the line so that the window now glides above the break in the line. The window has become enlarged in order to search for an image point. In FIG. 11C, several more scans have taken place and the tracing machine has advanced further along the template line. However, the window is still within the break and the enlarged size of the window is retained.

In FIG. 11D, the template line has again been reached by the scanning pattern on the other side of the break. An image point has been received and the register 103 (FIG. 8) has been reset to place the boundary of the open window at the edge of the template line. Scanning continues in FIG. 11E with the opening in the window reduced to its original size. Thus, the foregoing figures have illustrated the operation of the invention in maintaining operation of a curve tracing machine in the presence in a break in the template line which is being traced by the machine.

It is to be understood that the above-described embodiment of the invention is illustrative only and that modifications thereof may occur to those skilled in the art. Accordingly, this invention is not to be regarded as limited to the embodiment disclosed herein, but is to be limited only as defined by the appended claims.

What is claimed is:

1. In a curve follower circular scanning apparatus, a gating circuit for setting a sector window comprising:
   first means for timing the duration of a scan of a first sector;
   second means, triggered by said first timing means, for timing the duration of a scan of a second sector;
   means for signaling the presence of a subject within said window, said window being bounded by the sum of said first and said second sectors; and
   means responsive to said signaling means for resetting said first and said second timing means upon the detection of said subject.

2. A gating circuit according to claim 1 further comprising means responsive to said second timing means for resetting said first and said second timing means in the absence of the detection of said subject in said window.

3. A gating circuit according to claim 2 further comprising means responsive to said first and said second timing means for setting the boundaries of said sector window, a first boundary being set in accordance with timing by first timing means in the absence of said detection of a subject, and the second boundary being angularly spaced from said first boundary by said setting means in accordance with timing by said timing means.

4. A gating circuit according to claim 3 further comprising means responsive to said signalling means for presetting at least one of said timing means for differing durations of sector scan depending on the detection of said subject.

5. In a curve follower sector scanning apparatus comprising:
   first and second timing means for setting boundaries of a sector scan, said first timing means setting a first boundary of said boundaries; and
   means for combining elapsed times of said first and said second timing means for setting a second boundary of said boundaries, the timing operations of said first timing means and said second timing means being synchronized with a period of scan of said sector scan.

6. Apparatus according to claim 5 wherein each of said timing means is a variable length shift register, an output terminal of a first one of said shift registers being coupled to an input terminal of a second of said shift registers to accomplish a combining of elasped times measured by said first and said second timing means.

7. Apparatus according to claim 6 further comprising a flip-flop means coupled to said output terminal of said first shift register, said apparatus further comprising selection circuitry coupled between said flip-flop means and said first register and said second register for varying the lengths of said first register and said second register in accordance with a signal received from said flip-flop means.

8. Apparatus according to claim 5 further comprising means for sensing an image point of a subject being scanned, said sensing means resetting said first timing means upon a sensing of said image point.

9. Apparatus according to claim 8 wherein said first and said second timing means are preset to measure, respectively, first and second time intervals, said apparatus further comprising means responsive to said elapsed times for altering the lengths of said time intervals, thereby altering said boundaries in the absence of a sensing of an image point.

10. Apparatus according to claim 9 further comprising reset means responsive to a sensing of said image point by said sensing means for resetting said altering means upon said sensing of said image point.

11. In a curve follower comprising a circular array of image sensors and a scanner of these sensors for developing motor drive signals, the improvement being a scanning window circuit comprising, in combination:
   a plurality of timing units;
   a second of said timing units being activated by a first of said timing units;
   individual ones of said timing units setting respective bounds of a sector scan of said array; and
   means responsive to the sensing of an image by said array for resetting said timing units.

12. A window circuit according to claim 11 wherein said resetting means includes a flip-flop circuit, said flip-flop circuit providing a signal for altering the length of intervals time by said timing units.

13. A window circuit according to claim 12 further comprising a selection circuit coupled between said flip-flop circuit and said first and said second timing units for altering the lengths of said intervals in response to said signal of said flip-flop circuit.

14. A window circuit according to claim 13 wherein each of said timing units is a variable length shift register, each of said shift registers being clocked by a common clock signal.

15. A window circuit according to claim 11 further comprising gating means activated by said first timing unit for coupling an image signal of said array to said reset means.

16. A window circuit according to claim 15 wherein said first timing unit, upon being reset, operates said gate to exclude further image signals of said array.

17. A window circuit according to claim 16 wherein said first timing unit is reset by said second timing unit upon the setting of one of said bounds of said scan by said second timing unit.

* * * * *